United States Patent Office 3,421,880
Patented Jan. 14, 1969

---

3,421,880
AQUATIC HERBICIDE
Dorsey R. Mussell, Clare, and Theodore W. Holmsen, Midland, Mich., assignors to The Dow Chemical Company, Midland, Mich., a corporation of Delaware
No Drawing. Continuation-in-part of application Ser. No. 505,955, Nov. 1, 1965. This application Feb. 6, 1967, Ser. No. 614,021
U.S. Cl. 71—66          12 Claims
Int. Cl. A01m 9/18; C07c 161/02

ABSTRACT OF THE DISCLOSURE

The present invention is concerned with methods and compositions for controlling the growth of aquatic plants. These methods employ, and the compositions comprise, an active agent which is a thiocyanatoaniline compound of the formula

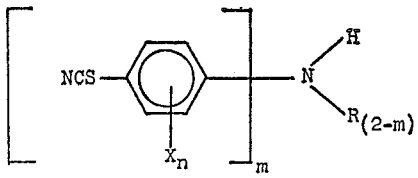

wherein R represents hydrogen, methyl, or acetyl; each X independently represents methyl, fluoro, chloro, bromo, or iodo; and each of $m$ and $n$ independently represents an integer of from 1 to 2, both inclusive; or its salt with hydrochloric, hydrobromic, sulfuric, or phosphoric acid.

---

Cross-references to related applications

This is a continuation-in-part of our copending application Ser. No. 505,955, filed Nov. 1, 1965, now abandoned.

Background of the invention

This invention is directed to methods and compositions for controlling aquatic plants. The expression "aquatic plants" as herein employed refers to vegetative organisms normally growing in water in which the leaf and stem parts are largely submerged. The expression is inclusive of water plants such as Ceratophyllum spp. and Salvinia spp., which are normally free-floating in their environment, as well as species which are typically rooted, such as Vallisneria spp. (tapegrass), Potamogeton spp., (pondweeds) and Lysimastrum spp., and species which appear to grow normally in all respects either free-floating or rooted, such as Cabomba spp. and Anacharis spp.

Aquatic plants growing out of place are commonly called aquatic weeds, and millions of dollars are expended annually for their control. In irrigation ditches, canals, lakes, rivers, and streams of pleasure and commerce, these plants hinder the flow of water and cause excessive sedimentation. Further, such growth causes high water loss from evaporation, and interferes with navigation. Mechanical operations such as dredging, chaining, burning, and mowing are among the means by which control is attempted. Limited efforts have been made at chemical control. The shortcomings of the latter methods have included superficial burning of foliage without killing of the plants, with the result that regrowth of the denuded plants takes place rapidly. Further, many of the proposed materials are as toxic to terrestrial plants as they are to aquatic plants so that the treated water is unsuited for irrigation or terrestrial crop plants or injurious to littoral vegetation which may be desirable for erosion control and for other reasons. Also, many of the chemicals are specific in their action and control only a few species, thus leading to increased growth activity on the part of unaffected plants.

Summary of the invention

It is an object of the present invention to provide improved methods and compositions for the control and suppression of the growth of aquatic plants. These methods employ, and the compositions comprise, a thiocyanatoaniline compound of the formula

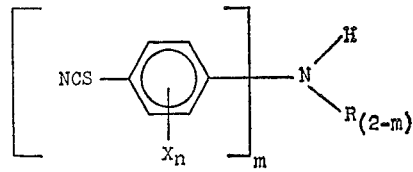

or its salt with hydrochloric, hydrobromic, sulfuric, or phosphoric acid. In the above and succeeding formulae in the present specification and claims, R represents hydrogen, methyl, or acetyl; each X independently represents methyl, fluoro, chloro, bromo, or iodo; and each of $m$ and $n$ independently represents an integer of from 1 to 2, both inclusive. In the present specification and claims, the term "thiocyanatoaniline," as in the generic term "thiocyanatoaniline compound" or as in the term "thiocyanatoaniline products," designating the numerous species, refers only to at least one of (A) a material of the foregoing structural formula and (B) its salt with hydrochloric, hydrobromic, sulfuric, or phosphoric acid. In the instance of the latter two (polyvalent) acids, the term "salt" is inclusive of the salts of partially ionized acids, that is hydrogen sulfate, dihydrogen phosphate, and hydrogen phosphate.

Representative thiocyanatoaniline products include the following, where $m$ represents 1: 2-bromo-4-thiocyanatoaniline; 2,3 - dichloro - 4 - thiocyanatoaniline; 2,3-dimethyl-4-thiocyanatoaniline; 2-iodo-4-thiocyanatoaniline; 3 - fluoro-4-thiocyanatoaniline; 2-methyl-5-chloro-4-thiocyanatoaniline; 2 - chloro - 6-methyl-4-thiocyanatoaniline hydrochloride; 2-chloro-4-thiocyanatoaniline sulfate; 3-bromo - N-acetyl-4-thiocyanatoaniline; 3-chloro-N-acetyl-4-thiocyanatoaniline phosphate; and 2-chloro-4-thiocyanatoaniline hydrogen phosphate;

And, where $m$ represents 2: bis(2-chloro-4-thiocyanatophenyl)amine; bis(3,5 - dimethyl-4-thiocyanatophenyl)amine; bis(3 - fluoro-4-thiocyanatophenyl)amine hydrochloride; bis(3 - bromo-4-thiocyanatophenyl)amine hydrogen phosphate; bis(2 - iodo-4-thiocyanatophenyl)amine; and bis(2-chloro-6-methyl-4-thiocyanatophenyl)amine.

Detailed description of the invention

According to the present invention it has been found that the thiocyanatoaniline products are very toxic to aquatic plants when such plants are contacted with the products or, preferably, with a composition comprising the products. The thiocyanatoaniline products are liquids or crystalline solid materials, typically the latter, which are soluble in many common organic solvents and of low solubility in water. They are adapted to be readily distributed in water to control aquatic weeds. It is among the advantages of the present invention that the products accomplish a quick kill of the stems and leaves of aquatic plants, accompanied by the control in a short period of time of the roots of rooted species. A particular advantage of the present invention is the wide range of water temperatures over which the compound is effective. Thus, the treatment may be carried out at almost any water temperature which will permit the growth and development of aquatic plants. A still further advantage of the methods and compositions of the present invention is their ability to control a wide variety of aquatic plants. In addition, the present invention can be practiced in waters varying widely as to pH and as to hardness, with no loss of efficacy.

The contacting of a portion of an aquatic plant with a growth-inhibiting amount of one or more of the thiocyanatoaniline products is essential for the practice of the present invention. In the present specification and claims, the term "growth-inhibiting" designates any effect of inhibiting the growth of, preventing the growth of, or killing, the undesirable aquatic vegetation.

The method of the present invention can be carried out by distributing a growth-inhibiting amount of one or more unmodified thiocyanatoaniline products or a composition containing the same in water adjacent to the growing plants to be treated. In general, good results are obtained when one or more of the active agents is distributed in water adjacent to growing aquatic plants in an amount of from about 0.1 to 100 or more parts by weight per million parts by weight of the environing water. The exact amount or concentration to be employed is dependent upon several factors such as water temperature, turbidity, the bulk and density of the plant mass to be treated, and whether the exposure is to be carried out in a moving stream such as a river or canal or in standing water such as a pond. In standing water, good results are obtained when employing minimal concentrations of the compound. In moving streams, somewhat higher concentrations may be required to provide for adequate contacting of the undesired plant growth with a growth-inhibiting amount of the active agent.

In addition, the method of the present invention can also be carried out by applying a growth-inhibiting amount of one or more unmodified thiocyanatoaniline products or a composition containing the same to the above-water-level, or emersed, portions of aquatic plants. Although the contacting of such emersed portions can be carried out in any manner, it is particularly preferred to apply the active agent by means of a spray application. The exact concentration of one or more thiocyanatoaniline products in a composition employed in such a spray application is not critical, it being necessary only that the concentration be sufficiently high that the aquatic plants receive a growth-inhibiting amount of active agent. In general, good results are obtained with compositions containing from .01 to 1 percent by weight of active agent. However, in concentrate applications, concentrations up to 25 percent, or higher, can be used. Rates will vary depending on such factors as the density of the emersed portions, the resistance of the particular species, and the like. Furthermore, where the emersed portion is not unduly dense, a certain amount of the spray or other treating composition will enter the water surrounding the submersed portions of the aquatic vegetation, and will to that extent also exert its growth inhibiting effect through the submersed portions. In such an instance, concentrations of the thiocyanatoaniline product or products in the treating composition can readily be lower.

In carrying out the practices of the present invention, the unmodified thiocyanatoaniline products can be employed; however, it is generally preferred to employ a composition comprising one or more of the thiocyanatoaniline products. In the latter instance of a composition comprising the active agent, the agent can be modified with one or more of a plurality of adjuvants, such as inert organic solvents, surface active dispersing agents, finely divided solids, and sticking or adhering agents. The preferred adjuvant is a surface active dispersing agent; representative such agents include the condensation products of alkylene oxides with phenols and organic acids; alkyl aryl sulfonates; polyoxyalkylene derivatives of sorbitan esters, mahogany soaps, and the like. Such compositions are readily and conveniently adapted to be distributed in water adjacent to aquatic plants to provide, in the water, growth-inhibiting concentrations of thiocyanatoaniline compound, or to be applied to emersed portions of aquatic plants similarly to supply to the plants growth-inhibiting concentrations of thiocyanatoaniline compound.

The exact concentration of the active agent to be employed in compositions for the treatment of aquatic plant infested loci is not critical and can vary provided that the required concentration of agent is supplied in the water adjacent to and in contact with at least part of each plant to be controlled.

A preferred composition to be employed in carrying out the methods of the present invention is a liquid composition comprising (A) thiocyanatoaniline compound, (B) an aromatic hydrocarbon solvent, and (C) a mixture of (1) an ionic wetting agent and (2) a nonionic wetting agent. In such composition, the identity of the particular aromatic hydrocarbon solvent is not critical; representative suitable solvents include benzene, toluene and xylene. Similarly, the identity of the ionic and non-ionic wetting agents is not critical; representative ionic agents include the alkyl aryl sulfonates; petroleum sulfonates; complex tars; mahogany soaps; and the like. Representative nonionic agents include alkyl aryl polyether alcohols; ethylene or propylene oxide condensates or substrates such as sorbitol, nonylphenol, and octylphenol; and the like.

This preferred liquid composition is prepared by dispersing the thiocyanatoaniline compound in the aromatic hydrocarbon solvent with the ionic and nonionic wetting agents. The composition thus prepared can comprise the ingredients in the amount of from about 1 to about 75 percent by weight of thiocyanatoaniline compound; 1 to 10 percent by weight of ionic wetting agent; and 1 to 10 percent by weight of nonionic wetting agent, the remaining portion being the aromatic hydrocarbon solvent.

Another preferred composition to be employed in carrying out the methods of the present invention is a granular composition comprising (A) thiocyanatoaniline compound, (B) an inert carrier medium, and (C) a wetting agent, which can be ionic or nonionic. Such composition can contain, in addition, a binding agent, which can be, for example, dextrin. This composition is prepared by any of the standard procedures. In the most typical procedure, the inert carrier medium, such as attapulgite, montmorillonite, pyrophyllite, gypsum, or the like, is fed, in granular form, into a rotary drum. Thereafter, the thiocyanatoaniline compound is dispersed in a volatile liquid, ordinarily methylene chloride, containing the wetting agent, and the resulting dispersion sprayed into the rotating drum. The resulting granules are removed from the drum and air dried in conventional procedures to remove the volatile liquid. Alternatively, thiocyanatoaniline compound can be mixed with the inert carrier medium, in a finely divided state, and with volatile liquid and the wetting agent, and the resulting composition extruded, in conventional procedures, to obtain another type of the preferred granular composition. In either procedure, the size of the granules can be varied and is not critical.

Such granular composition can comprise the ingredients in the amount of from about 1 to about 30 percent by weight of thiocyanatoaniline compound and from 0.1 to 10 percent by weight of wetting agent, the remaining portion being the inert carrier medium.

These preferred compositions are especially adapted to be employed in the practice of the present invention. More particularly, either of the compositions can be employed to effect the dispersion of thiocyanatoaniline compound in water which it is desired to treat in accordance with the present invention. In general, the former (liquid) composition is preferred where a rapid dispersion is desired, and the latter (granular) composition is preferred where slow release or localized treatment is desired. Where especially slow release is desired, it can be facilitated by coating the granules with a water-repellant material.

The method of the present invention is carried out by dispersing a growth-inhibiting amount of the thiocyanatoaniline compound in the water environing the submersed portions of the plants in a pond, lake, river, canal, stream, ditch, or other watercourse or body of water. This is readily accomplished by introducing the compound or a composition containing said compound into water above a plant mass so as to permit its dispersion in the water adjacent to and in contact with the growing plants. The introduction of the active agent into the water adjacent aquatic weeds may be accomplished conveniently by spraying, sprinkling, or scattering a composition onto or beneath the surface of the water or by metering a liquid composition into the vortex of a rapidly turning propeller to obtain maximum distribution of the compound in the water.

In moving watercourses, water flow may be employed to distribute the thiocyanatoaniline compound. Thus, the toxicant can be introduced into the water in such manner that it is distributed into and over the plan growth area for a sufficient exposure time to kill the plants.

In another procedure, the treatment can be applied over winter ice, typically by distributing thereupon the preferred granular composition described above. For such use, the carrier of the composition can be so chosen as to provide for a relatively fast or slow release of the active agent upon contact of the granules with water.

The following examples illustrate the invention but are not to be construed as limiting:

Example 1

In a representative operation, liquid water-dispersible concentrate compositions, each containing only one of the thiocyanatoaniline products, were prepared. Thereafter, each composition was dispersed in water in a series of four small tanks in each of which Myriophyllum spp. (Water milfoil), Cabomba caroliniana (cabomba), Salvinia rotundifolia (salvinia), Lysimastrum nummularia (moneywort) and Anacharis spp. (waterweed) were growing. The dispersion was carried out so that the concentration of each thiocyanatoaniline product in its respective four tanks was 10 parts, 5 parts, 2 parts and 1 part of product per million parts by weight of ultimate composition in the tank. Other tanks of water containing the named species were left untreated to serve as a control. All tanks were then placed under conditions conducive to the growth of aquatic vegetation. Three weeks following the treating operations, observations showed that in the tanks serving as a control, the named plant species were growing luxuriantly, whereas in all of the treated tanks, the named plant species exhibited varying degrees of fragmentation of leaves and stems, discoloration of leaves, and other growth-inhibiting aspects. In many of the treated tanks, inhibition was essentially complete, that is, the vegetation had been killed.

The following table sets forth the least concentration of product being evaluated at which growth inhibition of each of the named plant species was complete.

TABLE I

| Thiocyanatoaniline product being evaluated | Concentration, in parts, of product evaluated per million parts by weight of ultimate composition, to effect 100 percent kill | | | | |
|---|---|---|---|---|---|
| | Cabomba | Moneywort | Salvinia | Waterweed | Water Milfoil |
| 2-bromo-4-thiocyanatoaniline | 1 | 2 | 2 | 2 | 2 |
| 2-chloro-4-thiocyanatoaniline | 5 | 5 | 5 | 5 | 5 |
| 2,5-dibromo-4-thiocyanatoaniline | 2 | 5 | 5 | 5 | 5 |
| 2,3-dichloro-4-thiocyanatoaniline | 2 | 5 | 5 | 5 | 5 |
| 3-bromo-4-thiocyanatoaniline | 2 | 5 | 2 | 2 | 2 |
| 3-chloro-4-thiocyanatoaniline | 2 | 5 | 5 | 2 | 2 |
| 2,6-dichloro-4-thiocyanatoaniline | 2 | 5 | 5 | 10 | 5 |
| 3,5-dichloro-4-thiocyanatoaniline | 2 | 5 | 5 | 10 | 5 |
| 3-chloro-4-thiocyanatoaniline | 2 | 5 | 5 | 5 | 2 |
| 2-chloro-6-methyl-4-thiocyanatoaniline hydrochloride | 5 | 5 | 2 | 2 | 2 |
| 2,3-dimethyl-4-thiocyanatoaniline | 2 | 2 | 2 | 2 | 2 |
| 2,6-dimethyl-4-thiocyanatoaniline | 2 | 2 | 2 | 2 | 2 |

Examples 2 to 5

The products of the present invention were further evaluated as reported hereinbelow in Examples 2–5, inclusive. In these further evaluations, river water was used. This water was clear, being drawn from a large settling tank filled as need by off-flow from a river; the water was analyzed from time to time in the course of the various evaluations and its pH and ion concentration were found to be relatively uniform. A typical analysis showed 130 p.p.m. $HCO_3^-$, 130 p.p.m. $Cl^-$, 60 p.p.m. $SO^{--}$, 10 p.p.m. $Mg^{++}$, 45 p.p.m. $Ca^{++}$, and 6 p.p.m. $K^+$.

In these further evaluations, growth-inhibition was rated on a scale of from 0 to 10, 0 representing no discernible difference from the growth of a control, and 10 representing complete growth-inhibition, i.e., killing of the vegetation. The ratings were arrived at by consideration of specific parameters of growth inhibition, including discoloration, disintegration of leaves, fragmentation of stems, condition of growing tips, and degree of general disintegration.

Example 2

Various of the thiocyanatoaniline products were more extensively evaluated for the control of Anacharis spp. (waterweed). In these evaluations, large tanks containing the river water and sustaining a population of waterweed were employed. In some tanks, the waterweed plants were potted, in others, the plants were free-floating. (In the table hereinbelow, the symbol "P" is used to indicate potted plants.) The various products were each separately formulated as a dispersible concentrate composition by mixing with a quantity of acetone and an emulsifying agent. Each resulting composition was applied to the water in several tanks to provide various concentrations of the product in the several tanks. Certain tanks were held without treatment to serve as a control group. All tanks were held, for a period of about 6 weeks, under conditions conductive to the growth of aquatic vegetation. At the end of this period, the tanks were rated in accordance with the system described above. The results of this rating were as set forth in the following table:

TABLE II

| Thiocyanatoaniline product | Concentration of Thiocyanatoaniline product in parts per million | Rating of growth inhibition |
|---|---|---|
| 3-bromo-4-thiocyanatoaniline | 1.0 (P) | 5.5 |
| | 3.0 (P) | 5.5 |
| 2-chloro-4-thiocyanatoaniline | 1.0 (P) | 6.5 |
| | 3.0 (P) | 8.0 |
| 2-iodo-4-thiocyanatoaniline | 0.5 | 5.5 |
| 3-fluoro-4-thiocyanatoaniline | 0.5 | 5.0 |
| 2-chloro-6-methyl-4-thiocyanatoaniline | 0.5 | 5.0 |
| 2-methyl-5-chloro-4-thiocyanatoaniline | 2.0 | 7.0 |
| Control | | 0 |

Example 3

Various of the thiocyanatoaniline products were evaluated for the control of *Ceratophyllum demersum* (coontail) and Najas spp. (naiad) in the procedures employed in Example 2. The results were as set forth in the following table:

TABLE III

| Thiocyanatoaniline product | Concentration of thiocyanatoaniline product in parts per million | Rating of growth inhibition, Coontail | Naiad |
|---|---|---|---|
| 3-bromo-4-thiocyanatoaniline | 1.0 | 6.0 | 9.0 |
|  | 3.0 | 9.0 | 10.0 |
| 2-chloro-4-thiocyanatoaniline | 1.0 | 7.5 | 10.0 |
|  | 3.0 | 10.0 | 10.0 |
| 2-bromo-4-thiocyanatoaniline | 1.0 | 7.5 | 10.0 |
|  | 3.0 | 10.0 | 10.0 |
| 3,5-dichloro-4-thiocyanatoaniline | 0.5 | 3.0 | 5.5 |
| 2-methyl-5-chloro-4-thiocyanatoaniline | 0.5 | 7.5 | 8.5 |
|  | 2.0 | 9.0 | 10.0 |
| Control |  | 0.0 | 0.0 |

Example 4

Various of the thiocyanatoaniline products were further evaluated for the control of *Potamogeton pectinatus* (sago pondweed) in the procedures of Example 2. Results were as set forth in the following table:

TABLE IV

| Thiocyanatoaniline product | Concentration of Thiocyanatoaniline product in parts per million | Rating of growth inhibition |
|---|---|---|
| 3-bromo-4-thiocyanatoaniline | 1.0 (P) | 6.0 |
|  | 3.0 (P) | 8.0 |
| 2-chloro-4-thiocyanatoaniline | 1.0 (P) | 5.0 |
|  | 3.0 (P) | 7.5 |
| 2-bromo-4-thiocyanatoaniline | 1.0 (P) | 7.0 |
|  | 3.0 (P) | 6.5 |
| Control |  | 0.0 |

Example 5

2-Chloro-4-thiocyanatoaniline was more extensively evaluated for the control of *Ceratophyllum demersum* (coontail); *Najas* spp. (naiad); *Anacharis candenses* (waterweed); *Potamogeton pectinatus* (sago pondweed); and *Heteranthera dubia* (Water star grass). All species were potted except coontail. The valuations were carried out in accordance with the procedures of Examples 2–4 inclusive except that the evaluations were carried out in outdoor pools fully exposed to normal weather conditions. Results were as set forth in the following table:

TABLE V

| Thiocyanatoaniline Product | Concentration of thiocyanatoaniline product in parts per million | Rating of growth inhibition | | | | |
|---|---|---|---|---|---|---|
|  |  | Coontail | Naiad | Waterweed | Sago pondweed | Water star grass |
| 2-chloro-4-thiocyanatoaniline | 1.0 | 9.0 | 9.5 | 6.0 | 4.5 | 7.0 |
|  | 3.0 | 10.0 | 10.0 | 7.5 | 6.0 | 7.0 |
| Control |  | 0.0 | 0.0 | 0.0 | 0.0 | 0.0 |

Example 6

Fifty parts by weight of 2-chloro-4-thiocyanatoaniline and 5 parts by weight of an alkyl aryl polyether alcohol (Triton X–155) are mixed and blended together to prepare a water dispersible concentrate composition.

Also an emulsifiable concentrate is prepared by mechanically mixing and blending together 25 parts by weight of 2-chloro-4-thiocyanatoaniline, 10 parts by weight of an alkyl aryl polyether alcohol (Triton X–155), and 65 parts by weight of xylene.

In a similar manner, 5 parts by weight of 2-chloro-4-thiocyanatoaniline, 81 parts of fuller's earth, 2 parts of an alkyl aryl sulfonate (Nacconol NR) and 2 parts of a polymerized sodium salt of a substituted benzoid alkyl sulfonic acid (Daxad No. 27) are mechanically mixed and ground togther to prepare a concentrate composition in the form of a wettable powder.

Also 20 parts by weight of 2-chloro-4-thiocyanatoaniline, 10 parts of an alkyl aryl polyether alcohol (Triton X–155), and 200 parts of water are intimately mixed and blended together to prepare a water dispersible liquid concentrate composition.

Other compositions are prepared in similar manner except that in place of 2-chloro-4-thiocyanatoaniline, one of the following is employed: 2-bromo-4-thiocyanatoaniline; 2,3-dichloro-4-thiocyanatoaniline; 3-chloro-4-thiocyanatoaniline hydrochloride; 2,6-dimethyl-4-thiocyanatoaniline; 2-iodo-4-thiocyanatoaniline; and 3-fluoro-4-thiocyanatoaniline.

These concentrate compositions or aqueous dispersions thereof are adapted to be employed to distribute growth inhibiting amounts of the thiocyanatoaniline compound in water environing aquatic weeds.

Example 7

2-chloro-4-thiocyanatoaniline is dispersed in xylene with an alkyl aryl sulfonate (Nacconol NR) and an alkyl aryl polyether alcohol (Triton X–155) to prepare a liquid composition having preferred characteristics in the practice of the present invention.

Other preferred compositions are prepared in similar manner except that in place of the 2-chloro-4-thiocyanatoaniline one of the following is employed: 2-bromo-4-thiocyanatoaniline hydrobromide; 3-bromo-4-thiocyanatoaniline; and 2,6-dimethyl-4-thiocyanatoaniline.

Example 8

Preferred granular compositions are prepared by placing attapulgite (20 to 40 mesh size) in a rotary drum and spraying therein a liquid comprising methylene chloride, an alkyl aryl sulfonate (Nacconol NR), and one of the thiocyanatoaniline products. The drum is rotated for a period of about one-half hour, and the resulting material air dried to remove methylene chloride. As a result of these operations, there is obtained a granular composition containing attapulgite as inert carrier medium, one of the thiocyanatoaniline products, and a wetting agent.

Compositions of this type are prepared employing, separately, each of the thiocyanatoaniline products named in Example 7.

Example 9

In yet other operations, 3-bromo-N-acetyl-4-thiocyanatoaniline and 3-chloro-N-acetyl-4-thiocyanatoaniline were employed for the control of *Cabomba caroliniana* (commonly called simply cabomba). The operations were carried out as in Example 1, except that only one concentation of thiocyanatoaniline product, 10 parts per million, was utilized. At the end of the three-week period, the tanks were observed to determine the percent kill of cabomba. The results were as set forth in the following table:

TABLE VI

| Thiocyanatoaniline product | Percent kill of cabomba |
|---|---|
| 3-bromo-N-acetyl-4-thiocyanatoaniline | 100 |
| 3-chloro-N-acetyl-4-thiocyanatoaniline | 100 |

At the time of the observations, the control tanks contained luxuriant growths of cabomba.

Example 10

The products of the present invention were further evaluated for short-term exposure of *Ceratophyllum demersum* (coontail); *Najas* spp. (naiad); *Anacharis canadensis* (waterweed) to the products. The evaluations were carried out employing the same procedures as those of Example 2, except that the plants were exposed to the active agents for a period of hours only. Thereafter, the plants were removed, placed in fresh water, and similarly held for a period of six weeks, after which observations were made. The results of the observations were as set forth in the following table:

TABLE VII

| Thiocyanatoaniline product | Concentration of thiocyanatoaniline product in parts per million | Duration of exposure in hours | Rating of growth inhibition | | |
|---|---|---|---|---|---|
| | | | Coontail | Naiad | Waterweed |
| 3-bromo-4-thiocyanatoaniline | 5.0 | 0.5 | 9.0 | 8.0 | 6.0 (P) |
| | 5.0 | 2 | 9.5 | 10.0 | 6.5 (P) |
| 2-chloro-4-thiocyanatoaniline | 2.0 | 2 | 10.0 | 9.0 | 6.0 |
| | 5.0 | 0.5 | 9.5 | 7.5 | 6.5 (P) |
| | 5.0 | 2 | 10.0 | 10.0 | 6.5 (P) |
| 2-bromo-4-thiocyanatoaniline | 2.0 | 2 | 9.0 | 9.0 | 6.0 |
| | 5.0 | 0.5 | 8.5 | 8.5 | 6.5 (P) |
| | 5.0 | 2 | 9.5 | 10.0 | 6.5 (P) |

During the period of time in which the observations were made, the control tanks contained luxuriant growths of coontail, naiad, and waterweed.

The products to be employed as active agents in the practice of the present invention are prepared in known procedures. For example, when $m$ represents 1 and R represents hydrogen or methyl, the products are prepared by reacting an aniline compound of the formula:

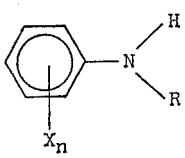

wherein the position para to the HNR group is unsubstituted and R represents hydrogen or methyl, and sodium thiocyanate in methanol saturated with sodium bromide. Thereafter, a solution of bromine in methanol saturated with sodium bromide is added, and the reaction mixture subsequently brought to pH 8 to obtain the desired product, typically a solid which can readily be separated by filtration. By this procedure are also prepared the products wherein $m$ represents 2; however, the starting material in that instance is a diphenylamine of the formula

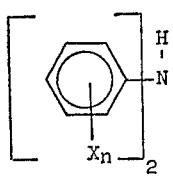

Those products wherein $m$ represents 1 and R represents acetyl are prepared from the corresponding products wherein R represents hydrogen by reaction of the latter with acetic anhydride.

Those compounds to be employed in accordance with the present invention wherein $m$ represents 1 and R represents hydrogen, and also those compounds wherein X represents bromo and/or chloro, constitute preferred embodiments of the present invention. Such preferred embodiments are described by the following formulae:

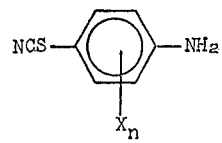

and

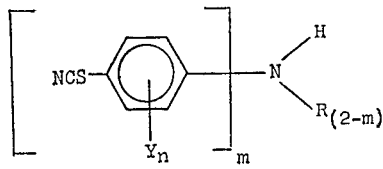

respectively, wherein Y represents bromo or chloro. Especially preferred are those:

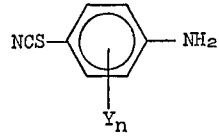

which have the advantages of both preferred embodiments. Preference in these embodiments is based on ease of synthesis, excellent activity at even very low rates, and other advantages in the practice of the present invention.

We claim:
1. Method which comprises the step of contacting a portion of an aquatic plant with a growth-inhibiting amount of an active agent which is a thiocyanatoaniline compound of the formula

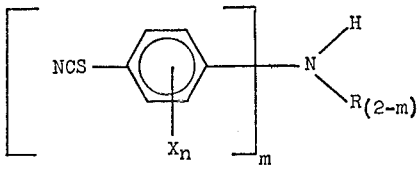

wherein R represents hydrogen, methyl, or acetyl; each X independently represents methyl, fluoro, chloro, bromo, or iodo; and each of $m$ and $n$ independently represents an integer of from 1 to 2, both inclusive; or its salt with hydrochloric, hydrobromic, sulfuric, or phosphoric acid.

2. The method of claim 1 wherein the active agent is a compound of the formula

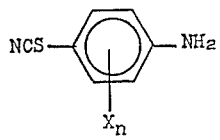

wherein each X independently represents methyl, fluoro, chloro, bromo, or iodo; and $n$ represents an integer of from 1 to 2, both inclusive; or its salt with hydrochloric, hydrobromic, sulfuric, or phosphoric acid.

3. The method of claim 2 wherein the active agent is 2-chloro-4-thiocyanatoaniline or its salt with hydrochloric, hydrobromic, sulfuric, or phosphoric acid.

4. The method of claim 1 wherein the active agent is a compound of the formula

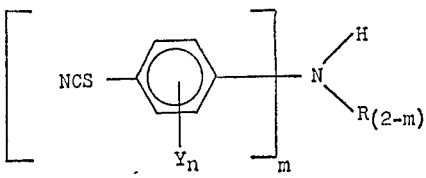

wherein R represents hydrogen, methyl, or acetyl; each Y independently represents bromo or chloro; and each of $m$ and $n$ independently represents an integer of from 1 to 2, both inclusive; or its salt with hydrochloric, hydrobromic, sulfuric, or phosphoric acid.

5. Method which comprises the step of introducing into water in contact with a submersed portion of an aquatic plant at least 0.1 part by weight of a thiocyanatoaniline compound per million parts of water, said thiocyanatoaniline compound being of the formula

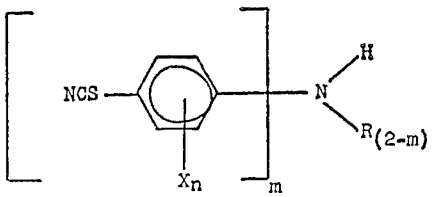

wherein R represents hydrogen, methyl, or acetyl; each X independently represents methyl, fluoro, chloro, bromo, or iodo; and each of $m$ and $n$ independently represents an integer of from 1 to 2, both inclusive; or its salt with hydrochloric, hydrobromic, sulfuric, or phosphoric acid.

6. The method of claim 5 wherein the thiocyanatoaniline compound is introduced into the water as a composition comprising the thiocyanatoaniline compound as an active ingredient in intimate mixture with an adjuvant.

7. The method of claim 6 wherein the adjuvant is a surface-active dispersing agent.

8. The method of claim 6 wherein the thiocyanatoaniline compound is 2-chloro-4-thiocyanatoaniline or its salt with hydrochloric, hydrobromic, sulfuric, or phosphoric acid.

9. A liquid composition useful as an aquatic herbicide comprising (A) a thiocyanatoaniline compound of the formula

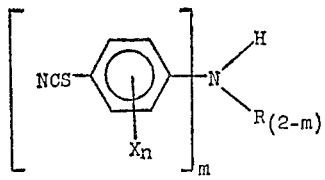

wherein R represents hydrogen, methyl, or acetyl; each X independently represents methyl, fluoro, chloro, bromo, or iodo; and each of $m$ and $n$ independently represents an integer of from 1 to 2, both inclusive; or its salt with hydrochloric, hydrobromic, sulfuric, or phosphoric acid;

(B) an aromatic hydrocarbon solvent; and (C) a mixture of
  (1) an ionic wetting agent, and
  (2) a nonionic wetting agent, said thiocyanatoaniline compound being present in amount sufficient to inhibit the growth of aquatic plants.

10. The composition of claim 9 wherein the thiocyanatoaniline compound is 2-chloro-4-thiocyanatoaniline or its salt with hydrochloric, hydrobromic, sulfuric, or phosphoric acid.

11. A granular composition useful as an aquatic herbicide comprising (A) a thiocyanatoaniline compound of the formula

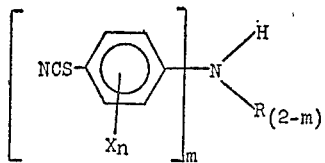

wherein R represents hydrogen, methyl, or acetyl; each X independently represents methyl, fluoro, chloro, bromo, or iodo; and each of $m$ and $n$ independently represents an integer of from 1 to 2, both inclusive; or its salt with hydrochloric, hydrobromic, sulfuric, or phosphoric acid;

(B) an inert carrier medium; and (C) a wetting agent, said thiocyanatoaniline compound being present in amount sufficient to inhibit the growth of aquatic plants.

12. The composition of claim 11 wherein the thiocyanatoaniline compound is 2-chloro-4-thiocyanatoaniline or its salt with hydrochloric, hydrobromic, sulfuric, or phosphoric acid.

References Cited

UNITED STATES PATENTS 3,285,730  11/1966  Weis et al. _____ 71—2.3

FOREIGN PATENTS 1,294,804  4/1962  France.

JAMES O. THOMAS, JR., *Primary Examiner.*

U.S. Cl. X.R.

71—104; 260—454